UNITED STATES PATENT OFFICE.

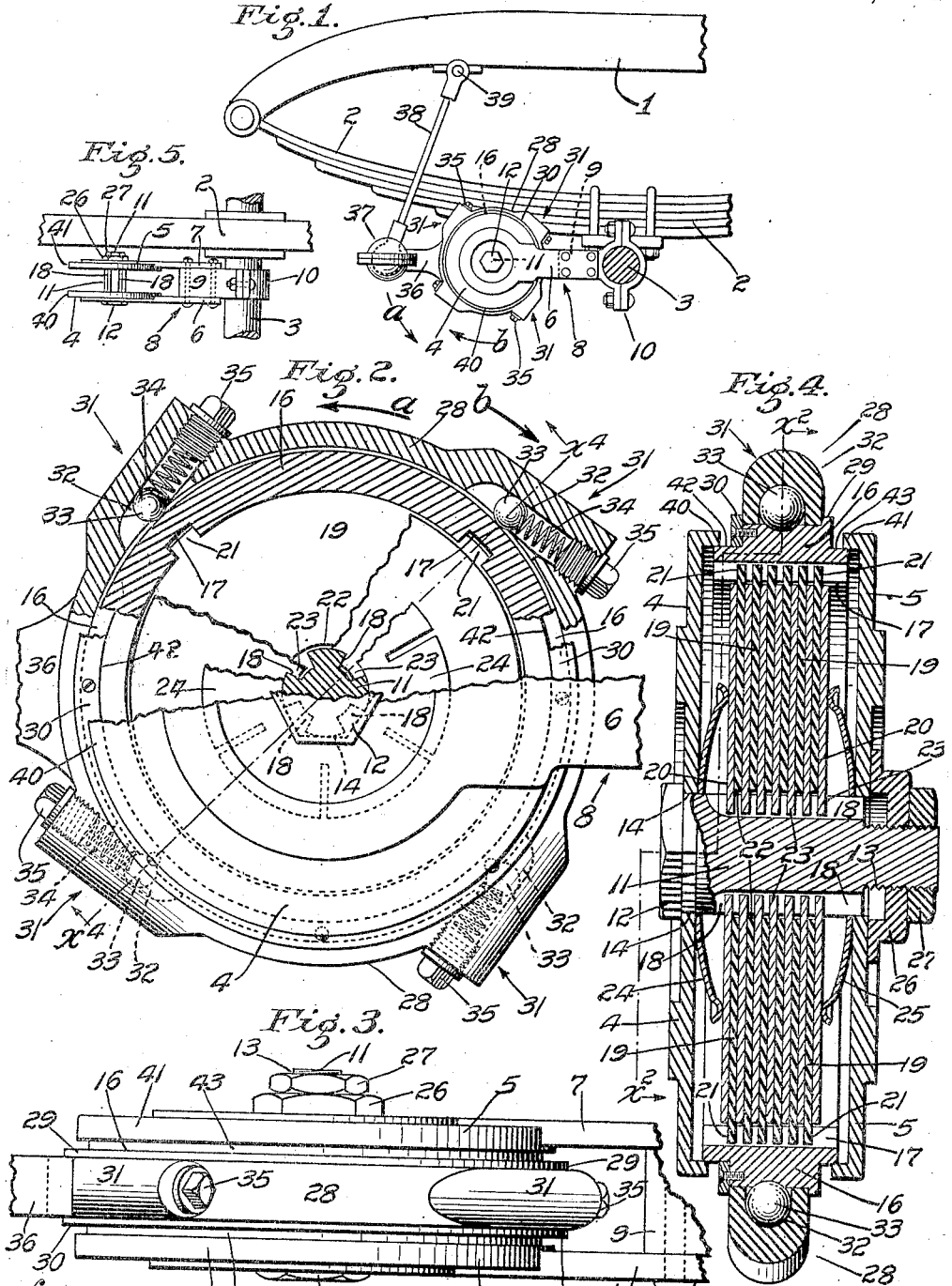
I. C. RICHARDS.
SHOCK ABSORBER.
APPLICATION FILED MAY 29, 1913.
1,088,450.
Patented Feb. 24, 1914.
Inventor
Ithiel C. Richards
by James R. Townsend
his Atty.

ITHIEL C. RICHARDS, OF LOS ANGELES, CALIFORNIA.

SHOCK-ABSORBER.

1,088,450.

Specification of Letters Patent.  Patented Feb. 24, 1914.

Application filed May 29, 1913. Serial No. 770,772.

*To all whom it may concern:*

Be it known that I, ITHIEL C. RICHARDS, a citizen of the United States, residing at Los Angeles, in the county of Los Angeles and State of California, have invented a new and useful Shock-Absorber, of which the following is a specification.

This invention relates to that class of shock absorbers in which mechanism is arranged to allow an automobile frame and axle to move toward each other freely, but to move from each other against comparatively great resistance. When a vehicle having such shock absorbers strikes a rock on the road the axles move up readily and compress the springs toward the frame. When the spring next attempts to expand away from the frame, the shock absorber becomes active and only permits said expansion to occur slowly. This dampens the vibrating tendency of the frame on the springs and thereby relieves the automobile body from much tossing as ordinarily experienced.

The accompanying drawings illustrate the invention.

Figure 1 is a side elevation showing the shock absorber mounted between the vehicle frame and axle. Fig. 2 is an enlarged fragmental elevation, partly in section and viewed from the irregular line $x^2$, Fig. 4. Parts are broken to expose interior construction. Fig. 3 is a plan view of Fig. 2. Fig. 4 is an enlarged section on line $x^4$, Fig. 2. Fig. 5 is a reduced fragmental plan view showing the forked member detached and secured upon the axle.

The shock absorber embodying my invention is shown as applied to an automobile—Fig. 1.

1 designates a portion of the automobile frame and 2 a portion of one of the ordinary springs, the latter being secured to the axle 3 in any approved manner. Two circular non-rotatable side plates 4 and 5, Fig. 4, are carried on the legs 6 and 7 of the forked member 8, Figs. 1 and 3. This forked member may be formed by riveting or bolting the legs 6 and 7 to a block 9, which block is in turn provided with the clamping means 10, Fig. 1, for securing the plates 4 and 5 and the hollow forked member to the axle 3. In view of the mounting just described the plates 4 and 5 may, of course, be moved toward or away from each other, the motion being effected by springing the legs 6 and 7. The purpose of this motion and the means for enforcing it will be described below. An arbor 11 passed through said plates and has a head 12 at one end and a screw-threaded portion 13 at the other end. The arbor passes through the hexagonal aperture 14, Fig. 4, in the plate 4, and at the portion which is adapted to register with said aperture said arbor is also made hexagonal so as to cause it to be non-rotatable relative to the plates.

A rotatable member 16 is mounted between the plates and around the arbor. This member has slots 17, Figs. 2 and 4, cut at intervals into its internal periphery. The arbor also has slots 18 cut into its external periphery. Within the chamber which is bounded by the plates 4, 5 and the rotatable member 16, and coöperating with slots 17 and 18 just described are two sets of friction disks 19 and 20, Fig. 2, these disks being alternately placed with respect to each other as shown in Fig. 4. The first of these sets of disks 19 is provided with projections 21, Fig. 2, adapted to register with slots 17 so as to operatively connect the disks to the rotatable member 16. At their central portions the disks in this set are provided with circular apertures 22 which embrace the adjacent cylindrical portion of the arbor. On the other hand, the second set of disks 20 is provided with inwardly-extending projections 23 adapted to register with slots 18 so as to operatively connect these disks to the arbor 11.

In the structure just described it will be clear that the set of disks 19 would rotate with the rotatable member 16, while the set of disks 20 would remain fixed in position on the relatively stationary arbor 11. These two sets of disks, therefore, though somewhat loose in a longitudinal direction, would bear upon each other frictionally as the aforesaid rotation occurs, and this frictional engagement is very important in the applicant's construction. It is magnified and made effective, however, by providing spring means in the form of dish-shaped springs 24 and 25 between the plates 4 and 5, and on either side of the disks. Said springs cause the disks to press upon each other, and the frictional engagement which is thereby produced acts like a drag or brake against the rotation of member 16. Whenever the plates 4 or 5 are moved together the springs 24 and 25 would be further compressed so as to increase the pressure between the disks and to increase the dragging or braking effect on member 16. Such motion of the plates may be effected by means of a suitable nut 26 which can be screwed along the threaded portion 13 of the arbor, and a lock nut 27 may also be provided for locking the nut 26.

For the purpose of completing the main portion of the shock absorber a clutch member 28 is provided, and this member is adapted to rotate freely in one direction, but is adapted to engage the rotatable member 16 when the clutch member is rotated in the other direction. This member 28 is shown in the form of an annular band which may be slipped around the rotatable member 16, and which is held in place by the shoulder 29, Fig. 4, on one side, and by the detachable retaining ring 30 on the other side. Of itself the member 28 would be free to rotate in either direction around member 16, but suitable clutching means arrest the rotation in one direction and cause member 28 to engage member 16, so as to rotate the two members together in that direction. This clutching means is carried in the pockets 31 which have the suitably formed ball chambers 32. Hard steel balls 33 are adapted to operate in these chambers and coöperate with member 28 on the one hand and member 16 on the other hand so as to produce the well-known ball clutch effect. The springs 34 normally urge the ball home to its clutching position and the caps 35 are screwed in place so as to retain the springs on the ball and so as to make the chamber 32 substantially dust tight. The member 28 has an arm 36, Fig. 1, and a suitable connection in the form of a ball and socket joint 37 connects said arm with a link 38. This link in turn is suitably connected to the vehicle frame 1 as at 39, and thereby completes the shock absorber connection between said frame and the spring and axle 2 and 3, respectively.

From the foregoing description the general operation of the absorber will be apparent. When the automobile strikes some irregularity, like a rock in the road, the spring 2 will be compressed upward toward the frame 1, thus carrying the axle 3 toward the frame. During this much of the action the clutch member 28 will rotate freely in the direction of arrow $a$, Figs. 1 and 2, around the member 16. After the shock is over with, however, the spring 2 will strive to expand away from the frame, and if left to itself it would not only do so rapidly but would set up a vibrating, or tossing action between the axle and frame, which would unnecessarily bounce the passengers in the automobile. All this is avoided when my shock absorber is used, because when spring 2 starts to expand away from frame 1 clutch member 28 is rotated in the direction of arrows $b$, Figs. 1 and 2. This causes balls 33 to operatively clutch members 28 and 16 together, so that member 16 together with friction disks 19 rotate in direction $b$. This rotation, however, is difficult, and labors against the braking or dragging friction between friction plates 19 and 20. These plates are forcibly pressed together by springs 24 and 25, and the friction produced permits disks 19 to rotate slowly. Obviously, this will react through link 38 so as only to permit spring 2 and axle 3 to expand away slowly from the frame 1. It is well known that such a dragging action will dampen any vibrating tendency between the spring and the frame and the bouncing of the passengers is thereby eliminated.

Over and above the general improvement in shock absorbers which this invention makes possible, it should be noticed that the construction above described is especially rugged, compact, fool-proof and cheap to manufacture. This is very important, owing chiefly to the severe conditions under which shock absorbers operate, and it is imperative to the success of such devices that the probability of breakage and necessity of repair be reduced to a minimum. With this in mind it should be noticed that the applicant has made every effort to properly relate and inclose the important elements and to reduce the operative parts to a minimum. In addition to inclosing the balls 33 in a dust tight chamber, the applicant has also provided an ingenious dust tight chamber within which the plates 19 and 20 and the springs 24 and 25 may operate. This chamber is made substantially dust tight by having the inwardly extending annular flanges 40 and 41 on the plates 4 and 5, respectively, and by having the cylindrical portions 42 and 43 on the rotatable member 16 respectively adapted to coöperate with rims 40 and 41 so as to close up the chamber as completely as is practical. With the construction shown it is clear that the plates 4 and 5 may still be moved toward or away from each other so as to adjust the tension of the springs 24 and 25, and that this motion will not in the least impair the dust proof feature just described.

I claim:—

1. In a shock absorber, the combination of two non-rotatable plates, said plates being mounted so that they may be moved toward or away from each other, an arbor passing through said plates and said arbor being non-rotatable relative to said plates, a rotatable member mounted between said plates and around said arbor, two sets of friction disks alternately placed with respect to each other, one set being connected to said arbor and the other set being connected to said rotatable member, spring means for causing said friction disks to press against each other, means for moving the first said plates toward each other and for adjusting said spring means so as to increase the pressure between the disks; and a clutch member adapted to rotate freely in one direction, but adapted to engage the rotatable member between the plates when said clutch member is rotated in the other direction.

2. In a shock absorber, the combination of two non-rotatable plates mounted so that said plates may be moved toward or away from each other, said plates having inwardly extending annular rims near their outer peripheries, an arbor passing through said plates, said arbor being non-rotatable relative to said plates, a rotatable member mounted between said plates and around said arbor, said rotatable member having cylindrical portions adapted to coöperate with said rims on the plates so as to form a substantially dust-proof chamber bounded by said plates and said rotatable member, two sets of friction disks in said chamber, said disks being placed alternately with respect to each other, one set being connected to said arbor and the other set being connected to said rotatable member, spring means in said chamber and adapted to cause said friction disks to press upon each other, means for causing the first said plates to move toward each other and for adjusting said spring means so as to increase the pressure between said friction disks; and a clutch member adapted to rotate freely in one direction but adapted to engage said rotatable member when said clutch member is rotated in the other direction.

3. In a shock absorber, the combination of two non-rotatable plates, said plates being substantially parallel to each other and being carried on the legs of a forked member, said plates being movable toward or away from each other, an arbor passing through said plates, said arbor being non-rotatable relative to said plates, a rotatable member mounted between said plates and around said arbor, two sets of friction disks, said disks being alternately placed with respect to each other, one set being connected to said arbor and the other set being connected to said rotatable member, two dish-shaped springs mounted between said plates and on opposite sides of the sets of friction disks, said springs being adapted to cause said friction disks to press against each other, means for causing said plates to move toward each other and for adjusting said springs so as to increase the pressure between the friction disks, and a friction clutch member which is free to rotate in one direction but which is adapted to engage said rotatable member when said clutch member is rotated in the other direction.

In testimony whereof, I have hereunto set my hand at Los Angeles, California, this 23d day of May, 1913.

ITHIEL C. RICHARDS.

In presence of—
JAMES R. TOWNSEND,
ROBERT A. STEPS.